United States Patent
Takai et al.

(10) Patent No.: US 9,395,178 B2
(45) Date of Patent: Jul. 19, 2016

(54) POSITION MEASURING DEVICE AND POSITION MEASURING METHOD

(71) Applicant: MITUTOYO CORPORATION, Kanagawa (JP)

(72) Inventors: Toshihisa Takai, Kawasaki (JP); Masahito Miyazaki, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 8 days.

(21) Appl. No.: 14/617,168

(22) Filed: Feb. 9, 2015

(65) Prior Publication Data
US 2015/0226852 A1   Aug. 13, 2015

(30) Foreign Application Priority Data

Feb. 13, 2014 (JP) .................................. 2014-025034

(51) Int. Cl.
| | |
|---|---|
| G01B 11/14 | (2006.01) |
| G01S 17/48 | (2006.01) |
| G01S 7/491 | (2006.01) |
| G01S 17/88 | (2006.01) |
| G01S 7/481 | (2006.01) |

(52) U.S. Cl.
CPC .............. *G01B 11/14* (2013.01); *G01S 7/4813* (2013.01); *G01S 7/4814* (2013.01); *G01S 7/4816* (2013.01); *G01S 7/4918* (2013.01); *G01S 17/48* (2013.01); *G01S 17/88* (2013.01)

(58) Field of Classification Search
CPC ........... A61B 5/14552; G06K 9/00805; G06K 9/00825; H04B 1/1638
USPC ........................ 356/623, 342, 479, 486–495
See application file for complete search history.

(56) References Cited

U.S. PATENT DOCUMENTS

2006/0262320 A1* 11/2006 Kawasaki .......... G01B 9/02004
                                                            356/495
2010/0225617 A1*  9/2010 Yoshimoto .............. G06F 3/042
                                                            382/100

FOREIGN PATENT DOCUMENTS

JP          2002-139311          5/2002

* cited by examiner

*Primary Examiner* — Kara E Geisel
*Assistant Examiner* — Iyabo S Alli
(74) *Attorney, Agent, or Firm* — Greenblum & Bernstein, P.L.C.

(57) ABSTRACT

A position measuring device includes a light emitter, an image capturer, a first beam splitter, a first light receiver, a second light receiver, a calculator, and a controller. The first light receiver receives light that propagates along a first optical axis toward the light emitter and is reflected by the first beam splitter, and outputs a first signal. The second light receiver outputs a second signal corresponding to an intensity of light propagating along a second optical axis toward the image capturer. The controller controls the intensity of the laser light based on the second signal when a difference between the first signal and the second signal is smaller than a predetermined threshold, and performs control so that the laser light has a predetermined intensity when the difference between the first signal and the second signal is equal to or greater than the threshold.

13 Claims, 12 Drawing Sheets

RELATED ART

RELATED ART

RELATED ART

POSITION MEASURING DEVICE AND POSITION MEASURING METHOD

CROSS-REFERENCE TO RELATED APPLICATIONS

The present application claims priority under 35 U.S.C. §119 of Japanese Application No. 2014-025034, filed on Feb. 13, 2014, the disclosure of which is expressly incorporated by reference herein in its entirety.

BACKGROUND OF THE INVENTION

1. Field of the Invention

The present invention relates to a position measuring device and a position measuring method that obtain a position using a triangulation method by receiving reflected light and scattered light of laser light irradiated on a surface of an object to be measured.

2. Description of Related Art

As position measuring devices that measure a position of a surface of an object to be measured in three-dimensional coordinates, there is a contact type position measuring device in which a probe is brought in contact with a surface of the object to be measured, and a non-contact type position measuring device that performs measurement by irradiating laser light on a surface of the object to be measured.

FIG. 10 illustrates a schematic diagram illustrating a non-contact type position measuring device that uses a triangulation method. As illustrated in FIG. 10, the position measuring device includes a light emitter 10 that emits laser light L1 toward an object to be measured OB (hereafter referred to as object OB), and an image capturer 20 that is provided on an optical axis that is non-parallel to an optical axis of the laser light L1. To measure a position of the object OB, the laser light L1 is emitted from the light emitter 10 toward the object OB, and scattered light of the laser light L1 at the object OB is captured by the image capturer 20. In the position measuring device, a disparity D is provided between the light emitter 10 and the image capturer 20. Therefore, based on position information Lx captured by the image capturer 20, a focal distance f and the disparity D, a displacement L of the object OB can be obtained using the triangulation method. Although the illustration in FIG. 10 is simplified, it is preferable that an optical system use a Scheimpflug optical system.

In such a non-contact type position measuring device, Japanese Patent Laid-Open Publication No. 2002-139311 discloses a configuration in which, based on an amount of light received of reflected light that is detected by a photosensor, an intensity of a light beam from a light beam radiator is corrected and an amount of light received by a line sensor is kept constant. That is, in the position measuring device described in Japanese Patent Laid-Open Publication No. 2002-139311, in order to improve measurement accuracy, control is performed so that an amount of light received is fed back to adjust an intensity of a light beam, and an amount of light captured by the line sensor is kept constant.

In a case where a predetermined angle is provided between the optical axis of the laser light and the optical axis of the image capturer as in the position measurement using the triangulation method, when there is an interfering object of some kind on the optical axis of the image capturer, a shadow is formed and it becomes impossible to receive enough diffused light. As described above, that diffused light being blocked from an object to be measured is blocked is referred to as "occlusion."

FIG. 11 illustrates a schematic diagram illustrating a state in which the occlusion is occurring. As illustrated in FIG. 11, in the case where the laser light L1 emitted from the light emitter 10 along a first optical axis a1 is irradiated on the object OB and the diffused light of the laser light L1 is captured by the image capturer 20, when there is another object OB2, for example, on a second optical axis a2 of the image capturer 20, a shadow is formed. Here, in the position measuring device described in Patent Literature 1, when such occlusion has occurred, in response to decrease in the amount of light received, feedback control is performed to increase the intensity of the laser light L1. As a result, the decrease in the amount of light received by the image capturer 20 is compensated.

However, when the occlusion is resolved in the state in which the intensity of the laser light L1 has been increased, more than necessarily intense diffused light is generated and the amount of the diffused light captured by the image capturer 20 becomes too large. When the amount of light received by the image capturer 20 is too large, a measurement result is affected and this becomes a factor causing accuracy of the position detection to decrease.

Further, FIGS. 12A and 12B respectively illustrate schematic diagrams of a state in which laser light is not irradiated on an object to be measured and a state in which the laser light is irradiated on the object to be measured. As illustrated in FIG. 12A, when the laser light L1 deviates from the object to be measured and propagates toward an open space, diffused light is not generated from the object OB. In such a case, since the amount of the diffused light received by the image capturer 20 is small, control to increase the intensity of the laser light L1 is performed.

However, as illustrated in FIG. 12B, when a measurement point moves so that the laser light L1 is irradiated on the object OB, the laser light L1 of a high intensity is temporarily irradiated on the object OB, and intense diffused light is generated. In particular, the diffused light is intensely generated at an edge part of the object OB. By receiving this very intense diffused light, the amount of light received by the image capturer 20 is likely to cause overflow.

SUMMARY OF THE INVENTION

A purpose of the present invention is to provide a position measuring device and a position measuring method that allow highly accurate position measurement to be performed even when an intensity of laser light is adjusted according to an amount of light received.

A position measuring device of the present invention includes a light emitter, an image capturer, a first beam splitter, a first light receiver, a second light receiver, a calculator and a controller. The light emitter emits laser light along a first optical axis for measuring a position of an object to be measured. The image capturer is provided on a second optical axis that is non-parallel to the first optical axis. The first beam splitter is provided on the first optical axis. The first light receiver receives light that propagates along the first optical axis toward the light emitter and is reflected by the first beam splitter, and outputs a first signal corresponding to a light intensity. The second light receiver outputs a second signal corresponding to an intensity of light propagating along the second optical axis toward the image capturer. The calculator calculates the position of the object to be measured based on the light propagating along the second optical axis. The controller controls an intensity of the laser light based on the second signal when a difference between the first signal and the second signal is smaller than a predetermined threshold, and performs control so that the laser light has a predetermined intensity when the difference between the first signal and the second signal is equal to or greater than the threshold.

According to such a configuration, among the laser light emitted from the light emitter, both the intensity of the light returning toward the light emitter side and the intensity of the light propagating toward the image capturer side are detected, and, according to these intensities, whether or not the occlusion is occurring is determined. When it is determined that the occlusion is occurring, control to increase the intensity of the laser light is not performed. As a result, at a stage when the occlusion is resolved, it is possible to prevent a situation where the amount of light captured by the image capturer temporarily becomes excessive.

In the position measuring device of the present invention, the controller may perform control so that the laser light has a predetermined intensity when an intensity of the first signal is equal to or smaller than a predetermined value. According to such a configuration, based on the intensity of the first signal, the state in which the laser light is not irradiated on the object to be measured can be determined.

In the position measuring device of the present invention, the controller may feedback-control the intensity of the laser light based on the second signal when the difference between the first signal and the second signal is smaller than the predetermined threshold, and may set the intensity of the laser light to a value equal to or smaller than a target value of the feedback control when the difference between the first signal and the second signal is equal to or greater than the threshold.

According to such a configuration, when the difference between the first signal and the second signal is smaller than the predetermined threshold, it is determined that it is in the state in which the laser light is irradiated on the object to be measured, and the intensity of the laser light is feedback-controlled. On the other hand, when the difference between the first signal and the second signal is equal to or greater than the threshold, it is determined that it is either in the state in which the occlusion is occurring or in the state in which the laser light is not irradiated on the object to be measured, and the intensity of the laser light is set to a value equal to or smaller than the target value of the feedback control. As a result, a problem occurring when the laser light is irradiated on the object to be measured thereafter can be resolved.

In the position measuring device of the present invention, a second beam splitter that is provided on the second optical axis may be further included, and the second light receiver may receive light reflected by the second beam splitter to output the second signal. According to such a configuration, the light propagating along the second optical axis toward the image capturer is reflected by the second beam splitter and is received by the second light receiver. Thereby, the second signal corresponding to the intensity of the light propagating toward the image capturer side can be accurately captured.

A position measuring device of the present invention includes a light emitter, a first beam splitter, a first light receiver, an image capturer, a calculator and a controller. The light emitter emits laser light along a first optical axis for measuring a position of an object to be measured. The first beam splitter is provided on the first optical axis. The first light receiver receives light that propagates along the first optical axis toward the light emitter and is reflected by the first beam splitter, and outputs a first signal corresponding to a light intensity. The first light receiver receives light that propagates along the first optical axis toward the light emitter and is reflected by the first beam splitter, and outputs a first signal corresponding to a light intensity. The image capturer receives light propagating along a second optical axis that is non-parallel to the first optical axis, and outputs a second signal corresponding to a light intensity. The calculator calculates the position of the object to be measured based on the light propagating along the second optical axis. The controller controls an intensity of the laser light based on the second signal when a difference between the first signal and the second signal is smaller than a predetermined threshold, and performs control so that the laser light has a predetermined intensity when the difference between the first signal and the second signal is equal to or greater than the threshold.

According to such a configuration, among the laser light emitted from the light emitter, both the intensity of the light returning toward the light emitter side and the intensity of the light received by the image capturer are detected, and, according to these intensities, whether or not the occlusion is occurring is determined. When it is determined that the occlusion is occurring, control to increase the intensity of the laser light is not performed. As a result, at a stage when the occlusion is resolved, it is possible to prevent a situation where the amount of light captured by the image capturer temporarily becomes excessive.

A position measuring method of the present invention includes: emitting laser light from a light emitter along a first optical axis; receiving light propagating along the first optical axis toward the light emitter to obtain a first signal corresponding to a light intensity; receiving light through an image capturer that is provided on a second optical axis, which is non-parallel to the first optical axis, and obtaining information about a light receiving position as well as receiving light propagating along the second optical axis toward the image capturer and obtaining a second signal corresponding to a light intensity; calculating a position of an object to be measured using the information about the light receiving position that is obtained through the image capturer; and controlling an intensity of the laser light based on the second signal when a difference between the first signal and the second signal is smaller than a predetermined threshold, and controlling the laser light so that the laser light has a predetermined intensity when the difference between the first signal and the second signal is equal to or greater than the threshold.

According to such a configuration, among the laser light emitted from the light emitter, both the intensity of the light returning toward the light emitter side and the intensity of the light propagating toward the image capturer side are detected, and, according to these intensities, whether or not the occlusion is occurring is determined. When it is determined that the occlusion is occurring, control to increase the intensity of the laser light is not performed. As a result, at a stage after the occlusion is resolved, it is possible to prevent a situation where the amount of light captured by the image capturer temporarily becomes excessive.

In the position measuring method of the present invention, the control of the intensity of the laser light may be performed so that the laser light has a predetermined intensity when an intensity of the first signal is equal to or smaller than a predetermined value. According to such a configuration, based on the intensity of the first signal, the state in which the laser light is not irradiated on the object to be measured can be determined.

In the position measuring method of the present invention, the control of the intensity of the laser light may be performed by feedback-controlling the intensity of the laser light based on the second signal when the difference between the first signal and the second signal is smaller than the predetermined threshold, and by setting the intensity of the laser light to a value equal to or smaller than a target value of the feedback control when the difference between the first signal and the second signal is equal to or greater than the threshold.

According to such a configuration, when the difference between the first signal and the second signal is smaller than the predetermined threshold, it is determined that it is in the state in which the laser light is irradiated on the object to be measured, and the intensity of the laser light is feedback-controlled. On the other hand, when the difference between the first signal and the second signal is equal to or greater than the threshold, it is determined that it is either in the state in which the occlusion is occurring or in the state in which the laser light is not irradiated on the object to be measured, and the intensity of the laser light is set to a value equal to or smaller than the target value of the feedback control. As a result, a problem occurring when the laser light is irradiated on the object to be measured thereafter can be resolved.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
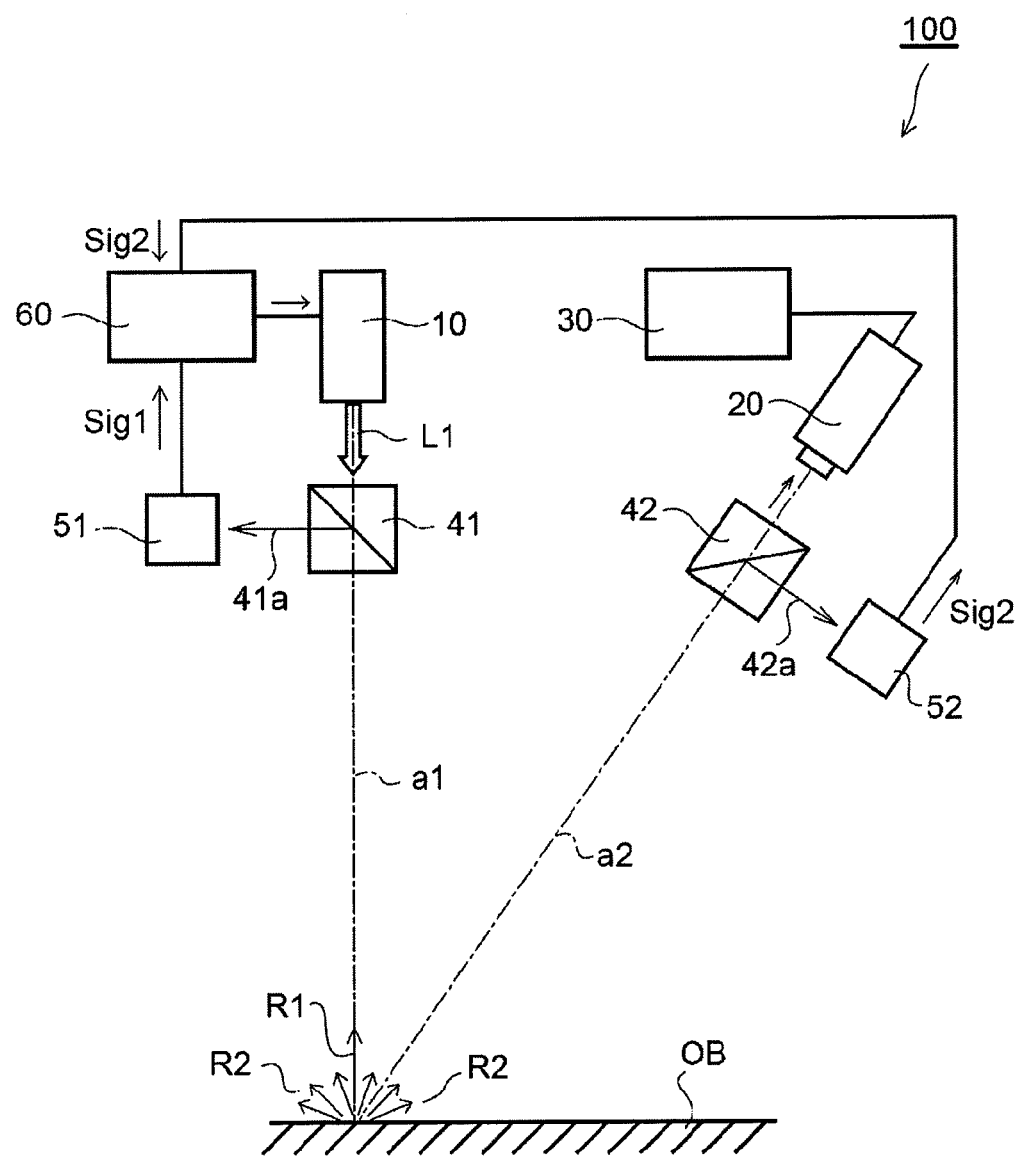
FIG. 1 illustrates a configuration of a position measuring device according to a first embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

In the following, embodiments of the present invention are described based on the drawings. In the present specification and the respective drawings, the same reference numerals are given to components that are the same as those described with regard to a described drawing and detailed description of the components will be appropriately omitted.

First Embodiment

FIG. 1 illustrates a configuration of a position measuring device according to a first embodiment. As illustrated in FIG. 1, a position measuring device 100 according to the present embodiment is a device that measures a position, for example, in three-dimensional coordinates of an object to be measured OB using a triangulation method. The position measuring device 100 includes a light emitter 10, an image capturer 20, a calculator 30, a first beam splitter 41, a first light receiver 51, a second light receiver 52 and a controller 60. In addition to the above configuration, the position measuring device 100 may also include a second beam splitter 42. In the present embodiment, an example is described in which the second beam splitter 42 is included.

The light emitter 10 includes a light source that emits laser light L1. The light emitter 10 emits the laser light L1 along a first optical axis a1 for measuring the position of the object OB. The image capturer 20 is provided on a second optical axis a2 that is non-parallel to the first optical axis a1. The image capturer 20 includes a line sensor or an image sensor, such as a CCD (Charge Coupled Device) or a CMOS (Complementary Metal-Oxide Semiconductor). The image capturer 20 mainly receives diffused light R2 of the laser light L1 irradiated on the object OB and outputs a signal corresponding to a light intensity.

Figure 8:
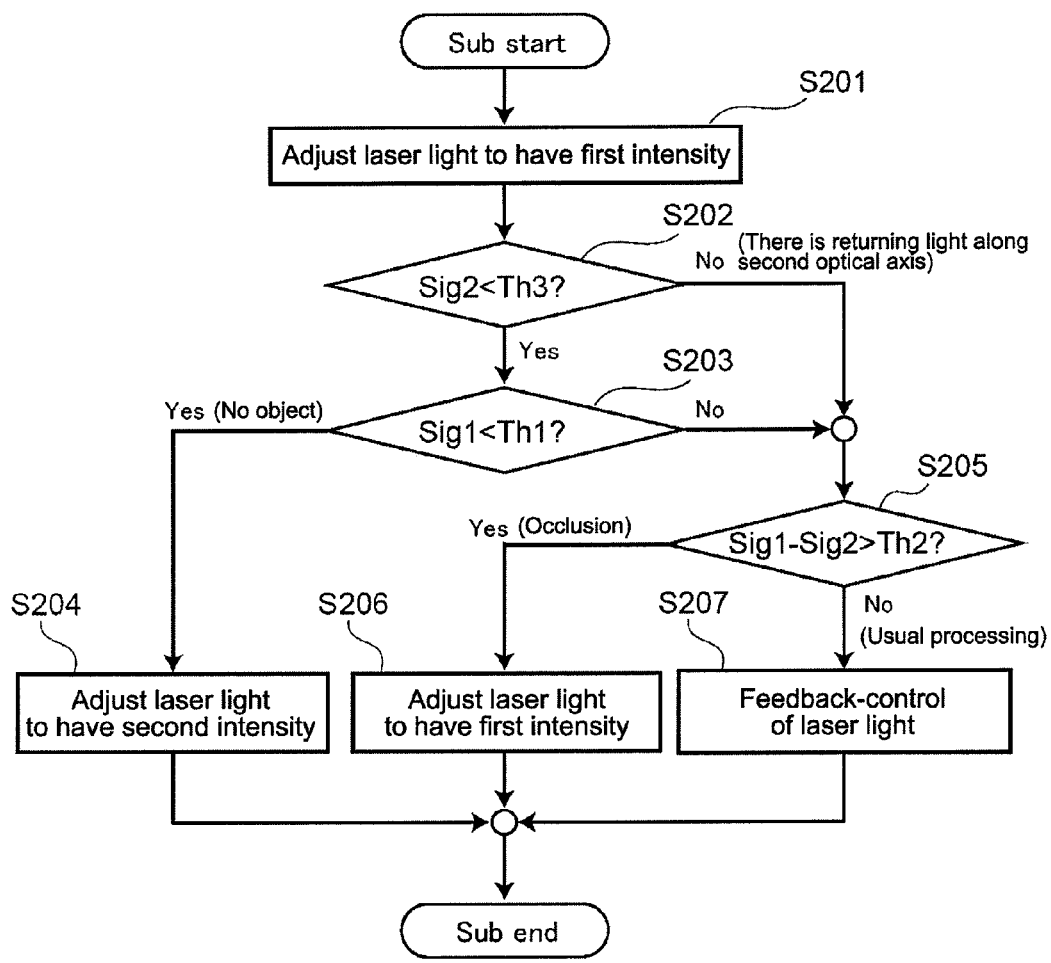
FIG. 8 illustrates a flowchart illustrating a subroutine of the position measuring method according to the third embodiment.

The calculator 30 calculates the position of the object OB based on light propagating along the second optical axis a2. That is, the calculator 30 calculates the position of the object OB based on the signal output from the image capturer 20. The calculator 30 obtains, for example, a position of a pixel of a sensor of which an amount of light is largest based on the electrical signal output from the image capturer 20, and then calculates the position of the object OB, for example, in three-dimensional coordinates using a triangulation method as illustrated in FIG. 8.

The first beam splitter 41 is provided on the first optical axis a1. The first beam splitter 41 is arranged between the light emitter 10 and the object OB on the first optical axis a1. The first beam splitter 41 transmits the laser light L1 emitted from the light emitter 10 to the object OB side and reflects reflected light R1, which is reflected by the object OB and returns along the first optical axis a1 toward the light emitter 10, toward a direction orthogonal to the first optical axis a1. The first beam splitter 41 is, for example, a half mirror. The first beam splitter 41 may be other than a half mirror as long as the first beam splitter 41 can separate incident light into transmitted light and reflected light.

The first light receiver 51 receives first reflected light 41a that propagates along the first optical axis a1 toward the light emitter 10 and is reflected by the first beam splitter 41, and outputs a first signal Sig1 corresponding to a light intensity. The first light receiver 51 receives the first reflected light 41a that is reflected by the first beam splitter 41, that is, the first reflected light 41a that is reflected by the first beam splitter 41 among the reflected light R1 of the laser light L1 reflected by the object OB. Therefore, the first signal Sig1 output from the first light receiver 51 has a value corresponding to an intensity of the reflected light R1 of the laser light L1 at the object OB. The first light receiver 51 includes, for example, a photodiode.

The second beam splitter 42 is provided on the second optical axis a2. The second beam splitter 42 is arranged between the image capturer 20 and the object OB on the second optical axis a2. The second beam splitter 42 transmits a portion of the diffused light R2 of the laser light L1 that is diffused on a surface of the object OB to the image capturer 20 side and reflects a portion of the diffused light R2 to a direction orthogonal to the second optical axis a2. The second beam splitter 42 is, for example, a half mirror. The second beam splitter 42 may be other than a half mirror as long as the second beam splitter 42 can separate incident light into transmitted light and reflected light.

The second light receiver 52 outputs a second signal Sig2 corresponding to an intensity of light propagating toward the image capturer 20 along the second optical axis a2. In the present embodiment, the second light receiver 52 receives second reflected light 42a that propagates along the second optical axis a2 toward the image capturer 20 and is reflected by the second beam splitter 42, and outputs the second signal Sig2 corresponding to a light intensity. The second light receiver 52 receives the second reflected light 42a that is reflected by the second beam splitter 42, that is, the second reflected light 42a that is reflected by the second beam splitter 42 among the diffused light R2 of the laser light L1 on the surface of the object OB. Therefore, the second signal Sig2 output from the second light receiver 52 has a value corresponding to an intensity of the diffused light R2 of the laser light L1 at the object OB. The second light receiver 52 includes, for example, a photodiode. In a configuration that does not include the second beam splitter 42, the second light receiver 52 may capture light reflected by the image capturer 20 (reflected light of the diffused light R2) to output the second signal Sig2.

The controller 60 controls the intensity of the laser light L1 emitted from the light emitter 10. When a difference between the first signal Sig1 and the second signal Sig2 is smaller than a predetermined threshold, the controller 60 controls the intensity of the laser light L1 based on the second signal Sig2. On the other hand, when the difference between the first signal Sig1 and the second signal Sig2 is equal to or greater than the threshold, the controller 60 performs control so that the laser light L1 has a predetermined intensity.

Based on the difference between the first signal Sig1 and the second signal Sig2, the controller 60 determines occurrence of the occlusion or a state in which the laser light L1 is not irradiated on the object OB. When the occlusion is occurring or when it is determined that it is in the state in which the laser light L1 is not irradiated on the object OB, control to increase the intensity of the laser light L1 is not performed.

Specifically, when the occlusion is occurring or when it is determined that it is in the state in which the laser light L1 is not irradiated on the object OB, the controller 60 performs control so that the intensity of the laser light L1 is smaller than a usual intensity.

Further, when the intensity of the first signal Sig1 is equal to or smaller than a predetermined value, the controller 60 may perform control so that the laser light L1 has a predetermined intensity. That is, when the intensity of the first signal Sig1 is equal to or smaller than the predetermined value, the controller 60 determines that it is in the state in which the laser light L1 is not irradiated on the object OB. As a result, the controller 60 does not perform control to increase the intensity of the laser light L1.

By performing such control, after the occlusion is resolved or at a stage of having entered a state in which the laser light L1 is irradiated from an open space to the object OB, it is possible to prevent a situation where an amount of light captured by the image capturer 20 temporarily becomes excessive.

Here, changes of the first signal Sig1 and the second signal Sig2 when the position of the object OB is measured are described. First, a usual measurement state as illustrated in FIG. 1 is described. The laser light L1 emitted from the light emitter 10 is irradiated on the object OB along the first optical axis a1. From the surface of the object OB, the reflected light R1 and the diffused light R2 of the laser light L1 are generated. The reflected light R1 is light that returns along the first optical axis a1 among light that changes a propagation direction at the surface of the object OB. Further, the diffused light R2 is light that does not propagate along the first optical axis a1 among the light that changes the propagation direction at the surface of the object OB.

A portion of the diffused light R2 reaches the image capturer 20 along the second optical axis a2. The image capturer 20 outputs a signal corresponding to an amount of light received of the diffused light R2 to the calculator 30. Based on the signal, the calculator 30 calculates a distance between the object OB and the position measuring device 100 using a triangulation method.

In such a usual measurement state, a portion of the reflected light R1 (the first reflected light 41a) is reflected by the first beam splitter 41 and is captured by the first light receiver 51. The first light receiver 51 outputs the first signal Sig1 corresponding to the intensity of the first reflected light 41a. On the other hand, a portion of the diffused light R2 (the second reflected light 42a) is reflected by the second beam splitter 42 and is captured by the second light receiver 52. The second light receiver 52 outputs the second signal Sig2 corresponding to the intensity of the second reflected light 42a. Here, a value obtained by subtracting the second signal Sig2 from the first signal Sig1 in the usual measurement state is a first signal intensity difference ΔSig1.

Figure 2:
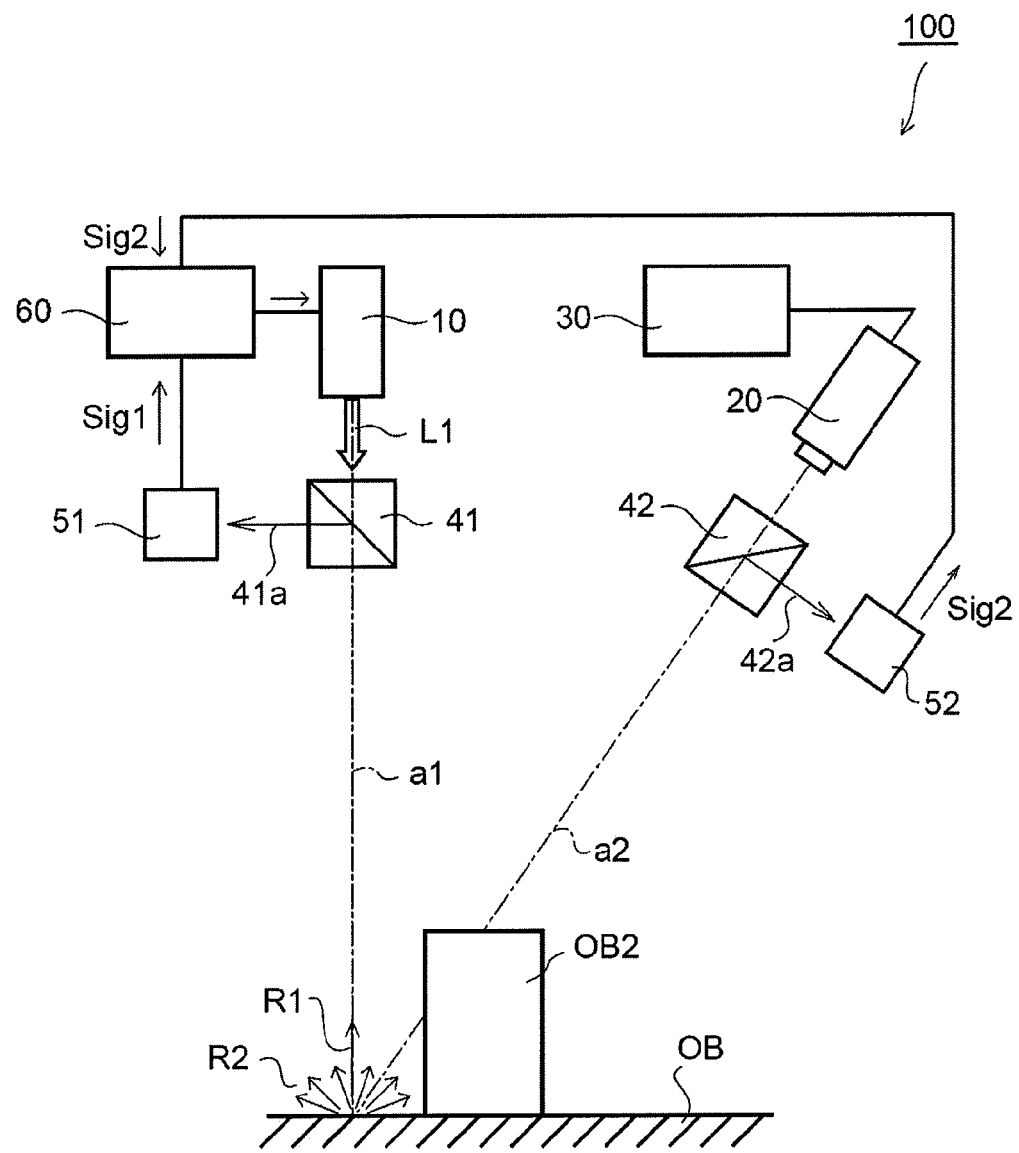
FIG. 2 illustrates a state in which the occlusion is occurring.

FIG. 2 illustrates a state in which the occlusion is occurring. Even in the state in which the occlusion is occurring, a portion of the reflected light R1 (the first reflected light 41a) is reflected by the first beam splitter 41 and is captured by the first light receiver 51. The first light receiver 51 outputs the first signal Sig1 having about the same degree as in the usual measurement state. On the other hand, since there is an object OB2 on the second optical axis a2, the diffused light R2 that propagates along the second optical axis a2 toward the image capturer 20 is blocked by the object OB2. Therefore, the second reflected light 42a that is reflected by the second beam splitter 42 to propagate toward the second light receiver 52 is hardly generated. That is, the intensity of the second signal Sig2 that is output from the second light receiver 52 is very small.

In the state in which the occlusion is occurring, a value obtained by subtracting the second signal Sig2 from the first signal Sig1 is a second signal intensity difference ΔSig2. In the state in which the occlusion is occurring, since the second signal Sig2 is very small, the second signal intensity difference ΔSig2 is greater than the first signal intensity difference ΔSig1 in the usual measurement state.

Figure 3:
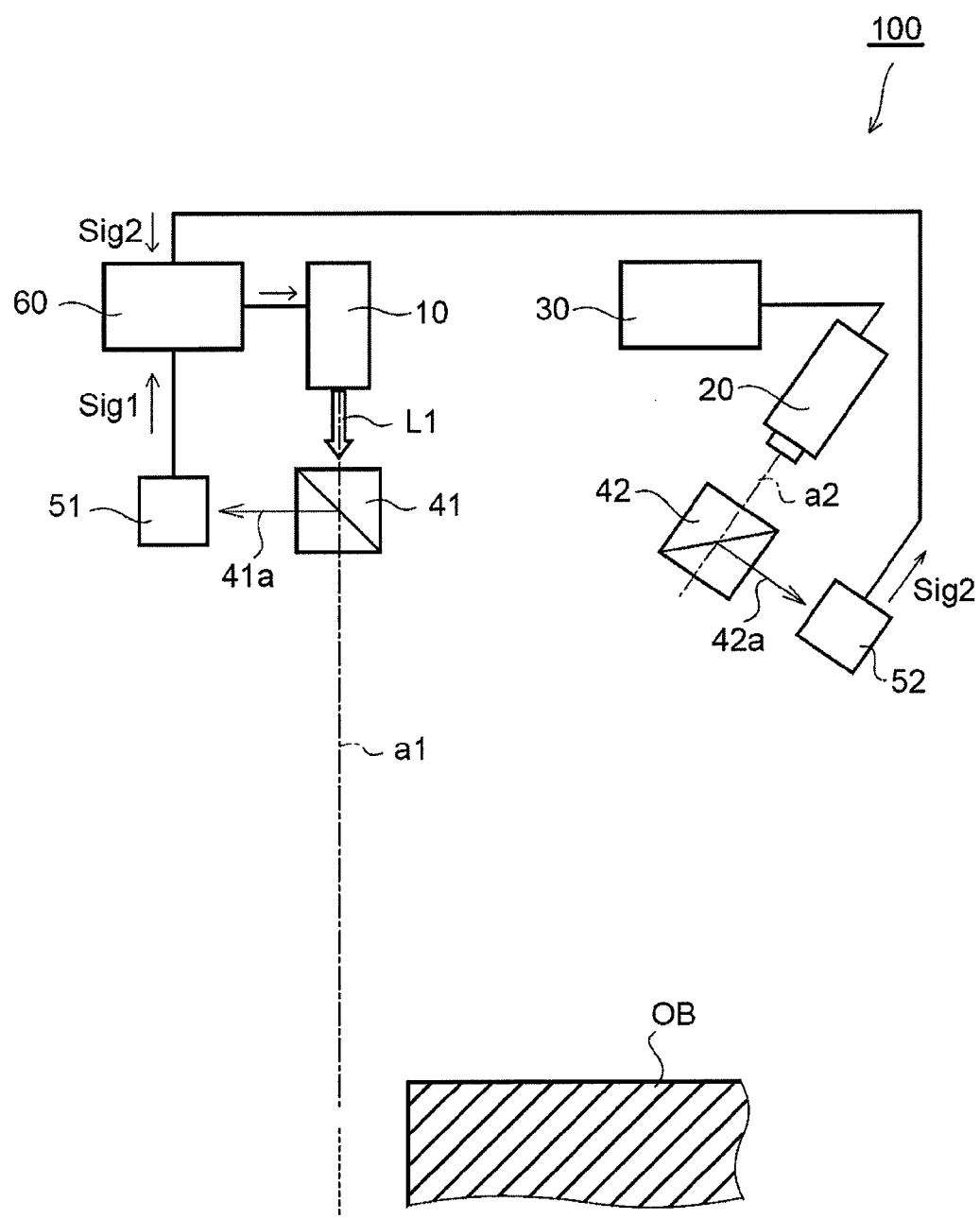
FIG. 3 illustrates a state in which laser light is not irradiated on an object to be measured.

FIG. 3 illustrates the state in which the laser light is not irradiated on the object to be measured. In the state in which the laser light L1 that is emitted from the light emitter 10 along the first optical axis a1 is not irradiated on the surface of the object OB, the reflected light R1 and the diffused light R2 are not generated. Therefore, the intensity of the first signal Sig1 that is output from the first light receiver 51 and the intensity of the second signal Sig2 that is output from the second light receiver 52 are both very small.

Based on such changes of the first signal Sig1 and the second signal Sig2 due to the differences of the states, the controller 60 determines whether it is in the usual measurement state (see FIG. 1), the state in which the occlusion is occurring (see FIG. 2), or the state in which the laser light L1 is not irradiated on the object OB (see FIG. 3).

As described above, based on the first signal Sig1 and the second signal Sig2, the controller 60 determines whether it is in the usual measurement state, the state in which the occlusion is occurring, or the state in which the laser light L1 is not irradiated on the object OB, and controls the intensity of the laser light L1 according to the result of the determination.

That is, when it is determined that it is in the usual measurement state, the controller 60 performs feedback control based on the second signal Sig2 so that the intensity of the laser light L1 reaches a predetermined value. As a result, the amount of the diffused light R2 from the object OB can be stable and highly accurate position measurement can be performed.

On the other hand, when it is determined that it is in the state in which the occlusion is occurring or in the state in which the laser light L1 is not irradiated on the object OB, the controller 60 performs control so that the intensity of the laser light L1 is decreased as compared to the case of the usual measurement. As a result, when the occlusion is resolved, or at a stage of having entered the state in which the laser light L1 is irradiated from an open space to the object OB, that the amount of the diffused light R2 temporarily becomes too much can be prevented. Therefore, in the image capturer 20, signal overflow is suppressed, and highly accurate position measurement can be performed.

Figure 4:
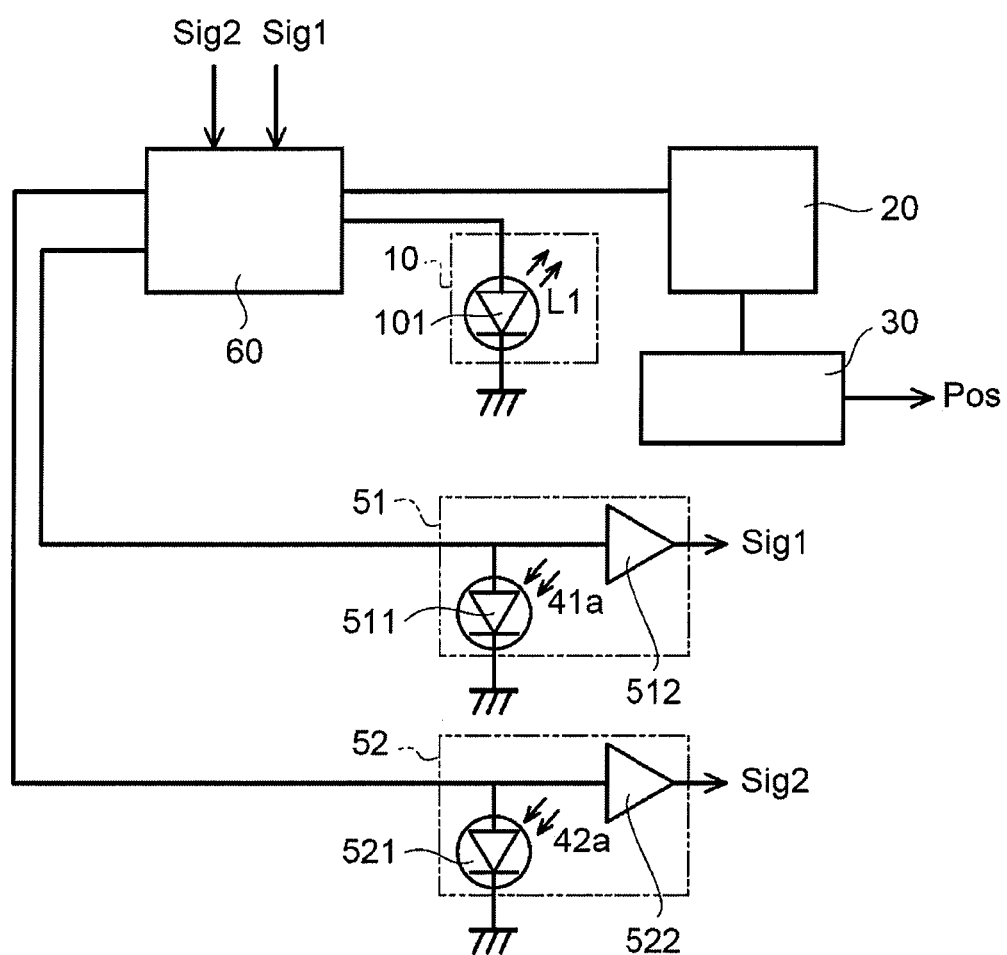
FIG. 4 illustrates a configuration diagram of the position measuring device according to the first embodiment.

FIG. 4 illustrates a configuration diagram of a position measuring device according to the first embodiment. The controller 60 controls power (for example, a current) supplied to the light source 101, which emits the laser light L1, to adjust the intensity of the laser light L1. The controller 60 may also control power supplied to the image capturer 20, and power supplied to the first light receiver 51 and the second light receiver 52.

The first light receiver 51 includes, for example, a first photodiode 511 and a first amplifier 512. The second light receiver 52 includes, for example, a second photodiode 521 and a second amplifier 522. The first photodiode 511 captures the first reflected light 41a and outputs a current corresponding to the intensity of the first reflected light 41a to the first amplifier 512. The first amplifier 512 outputs the first signal Sig1 that is converted to a voltage based on the current output from the first photodiode 511. The second amplifier 522 outputs the second signal Sig2 that is converted to a voltage based on a current output from the second photodiode 521.

The controller 60 uses the first signal Sig1 and the second signal Sig2 as input to control the power supplied to the light source 101. That is, as described above, the controller 60 uses the first signal Sig1 and the second signal Sig2 to perform calculation, and, based on the calculation result, determines whether it is in the usual measurement state, the state in which the occlusion is occurring, or the state in which the laser light L1 is not irradiated on the object OB.

When it is determined that it is in the usual measurement state, the controller 60 feedback-controls the power supplied to the light source 101 based on the second signal Sig2 so that the intensity of the laser light L1 reaches a predetermined value (first intensity). Further, when it is determined that it is in the state in which the occlusion is occurring or in the state in which the laser light L1 is not irradiated on the object OB, the controller 60 controls the power supplied to the light source 101 so that the intensity of the laser light L1 reaches a second intensity that is lower than the first intensity.

By performing such control, in the position measuring device 100 according to the present embodiment, after the occlusion is resolved or in the case of having entered the state in which the laser light L1 is irradiated from an open space to the object OB, it is possible to prevent a situation where an amount of light captured by the image capturer 20 temporarily becomes excessive, and highly accurate position measurement can be performed.

Second Embodiment

Figure 5:
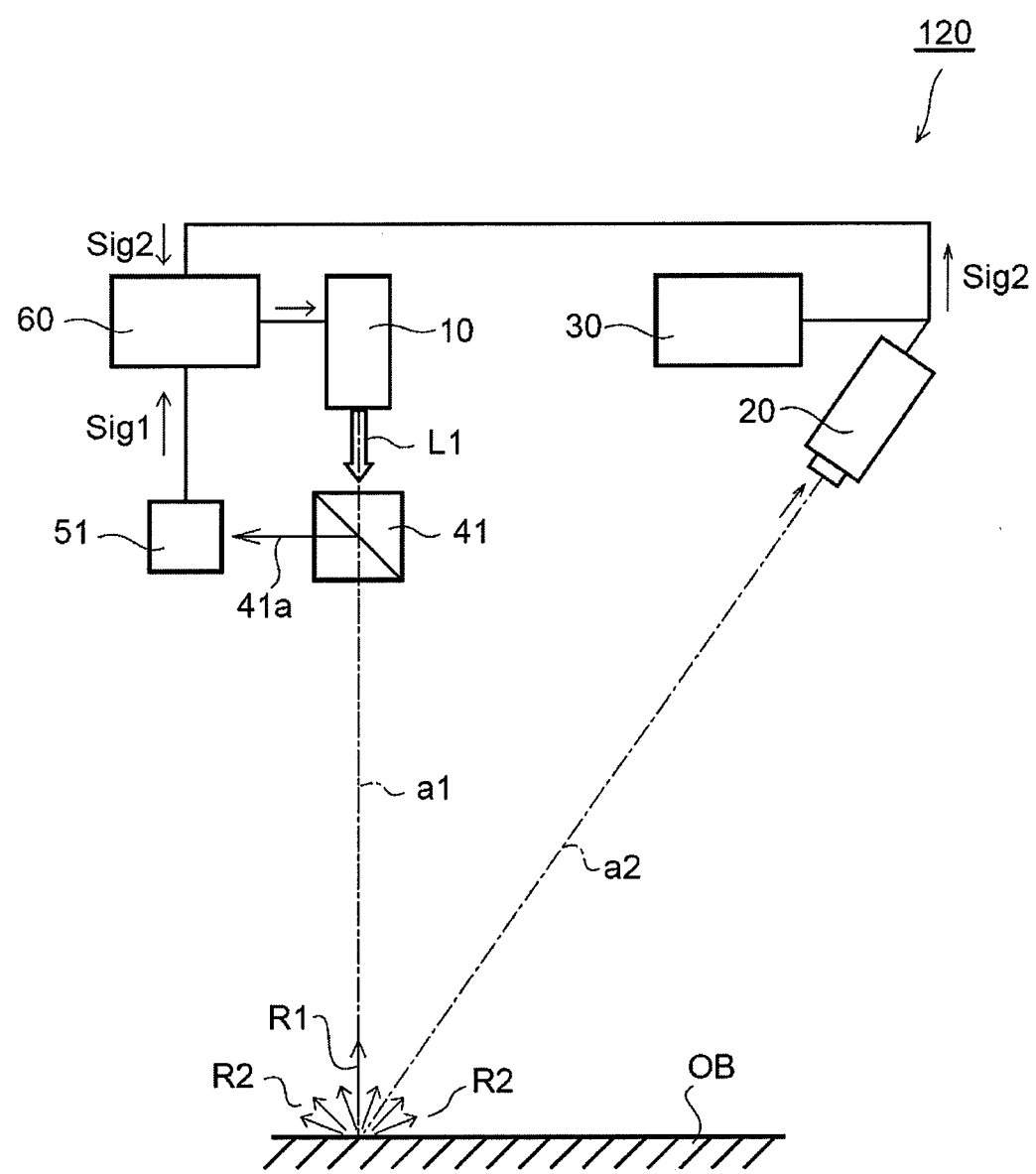
FIG. 5 illustrates a configuration of a position measuring device according to a second embodiment.
Figure 6:
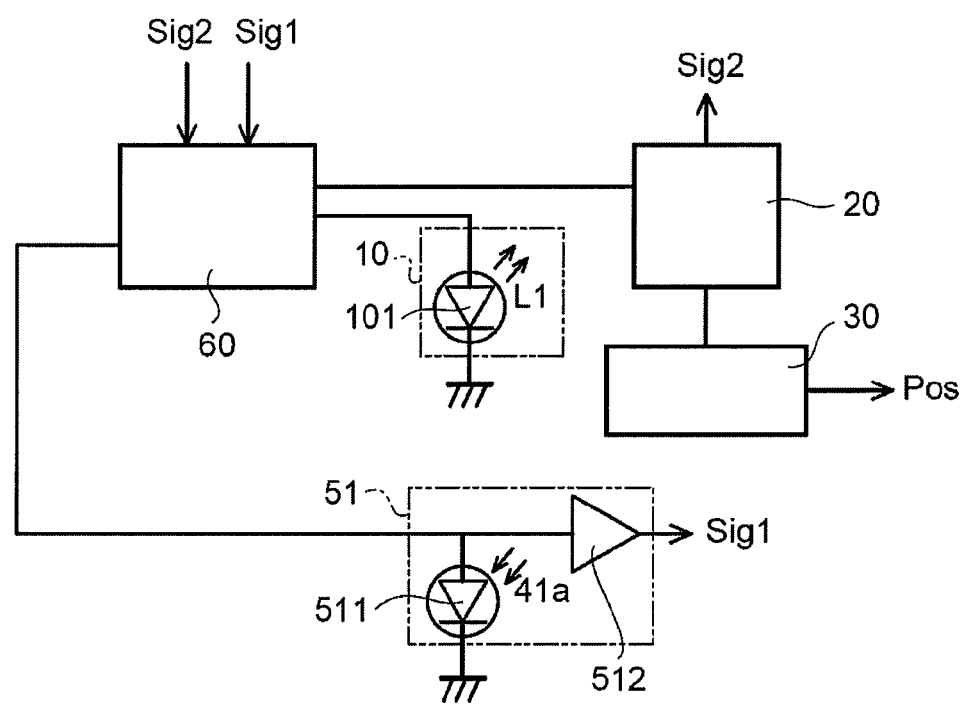
FIG. 6 illustrates a configuration diagram of the position measuring device according to the second embodiment.

FIG. 5 illustrates a configuration of a position measuring device according to a second embodiment. FIG. 6 illustrates a configuration diagram of the position measuring device according to the second embodiment. In a position measuring device 120 according to the second embodiment, the second beam splitter 42 and the second light receiver 52 of the position measuring device 100 according to the first embodiment are not provided. Other configuration components are the same as in the position measuring device 100.

In the position measuring device 120 according to the present embodiment, the light (diffused light R2) propagating along the second optical axis a2 is received by the image capturer 20. The image capturer 20 outputs the second signal Sig2 corresponding to the intensity of the received light. The controller 60 performs control, based on the first signal Sig1 and the second signal Sig2 that is output from the image capturer 20, similar to the position measuring device 100 according to the first embodiment.

In the position measuring device 120 according to the second embodiment, after the occlusion is resolved or in the case of having entered the state in which the laser light L1 is irradiated from an open space to the object OB, it is possible to prevent a situation where an amount of light captured by the image capturer 20 temporarily becomes excessive, and highly accurate position measurement can be performed. Further, in the position measuring device 120 according to the second embodiment, since the second beam splitter 42 and the second light receiver 52 are not provided, the device can be simplified as compared to the position measuring device 100.

Third Embodiment

Figure 7:
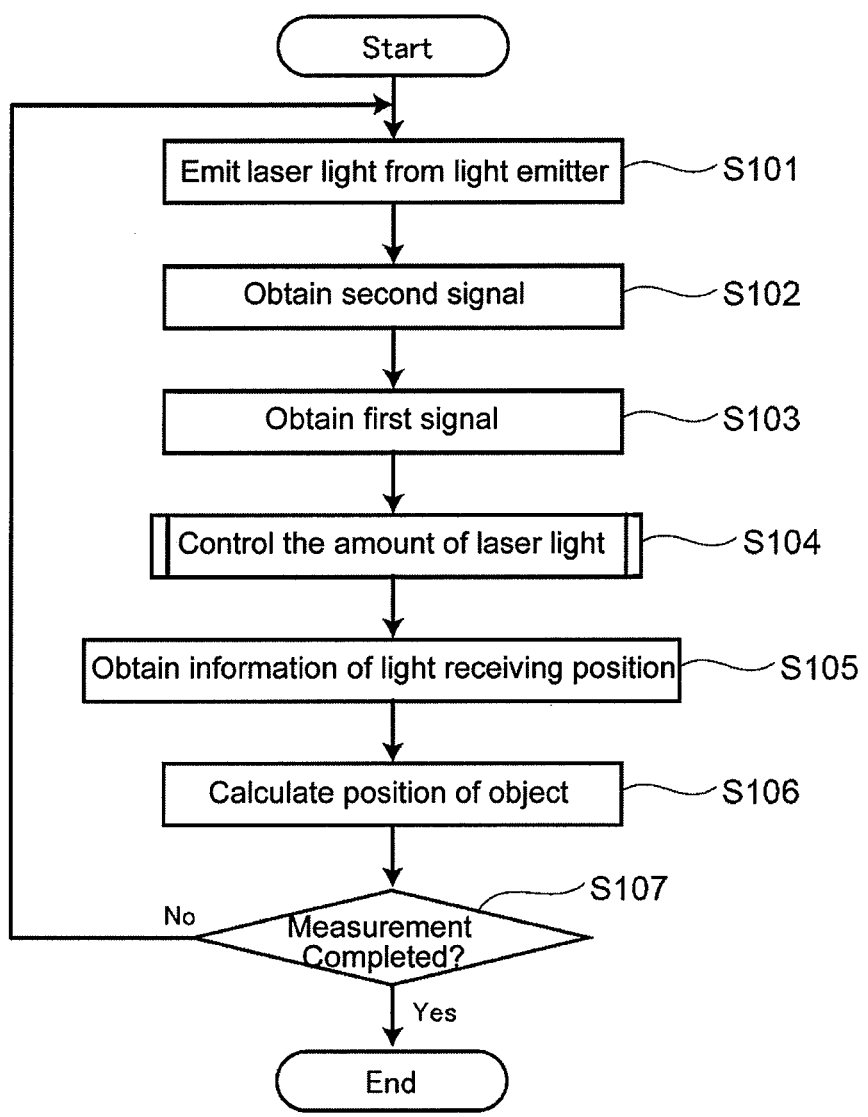
FIG. 7 illustrates a flowchart illustrating a position measuring method according to a third embodiment.

Next, a position measuring method according to a third embodiment is described. FIG. 7 illustrates a flowchart illustrating a position measuring method according to a third embodiment. FIG. 8 illustrates a flowchart illustrating a subroutine of the position measuring method according to the third embodiment. As illustrated in FIG. 7, in the position measuring method according to the present embodiment, first, the laser light L1 is emitted from the light emitter 10 (step S101). The laser light L1 is emitted from the light emitter 10 along the first optical axis a1 and is irradiated on the surface of the object OB.

Next, the second signal Sig2 is obtained (step S102). That is, the second signal Sig2 corresponding to the intensity of the diffused light R2 that propagates along the second optical axis a2 toward the image capturer 20 is obtained. For example, a portion of the diffused light R2 that propagates along the second optical axis a2 toward the image capturer 20 is separated by the second beam splitter 42 and is captured by the second light receiver 52. Then, the second signal Sig2 corresponding to the light intensity of the diffused light R2 is output from the second light receiver 52.

Next, the first signal Sig1 corresponding to the intensity of the light (reflected light R1) propagating along the first optical axis a1 toward the light emitter 10 is obtained (step S103). That is, a portion of the reflected light R1 returning along the first optical axis a1 toward the light emitter 10 is separated by the first beam splitter 41 and is captured by the first light receiver 51. Then, the first signal Sig1 corresponding to the light intensity of the reflected light R1 is output from the first light receiver 51.

Next, the amount of light of the laser light is controlled (step S104). The control of the laser light is performed according to the subroutine illustrated in FIG. 8. The subroutine will be described later.

Next, information of a light receiving position is obtained by the image capturer 20 (step S105). The image capturer 20 is provided on the second optical axis a2 that is non-parallel to the first optical axis a1. The image capturer 20 receives the diffused light R2 of the laser light L1 from the object OB and outputs information corresponding to an amount of light received for each pixel to the calculator 30.

Next, based on the information of the light receiving position output from the image capturer 20, the calculator 30 calculates a position of the object OB, for example, in three-dimensional coordinates (step S106). The calculator 30 calculates coordinates of a measurement point on the surface of the object OB using the triangulation method.

Next, whether or not the measurement has completed is determined (step S107). When the measurement has completed, the processing is terminated. When the measurement has not completed, the processing proceeds to step S101 and the steps following step S101 are repeated.

Here, a method for controlling the amount of the laser light at step S104 is described according to the subroutine of FIG. 8. First, the laser light L1 is adjusted to have the first intensity (step S201). The first intensity is an intensity equal to or smaller than a target value that is obtained by feedback-controlling the laser light L1 based on the second signal Sig2.

Next, comparison between the second signal Sig2 and a third threshold Th3 is performed (step S202). The third threshold Th3 is a threshold for determining whether or not there is returning light along the second optical axis a2. When the second signal Sig2 is smaller than the third threshold Th3, it is determined that there is no returning light along the second optical axis a2 and the processing proceeds to step S203. When the second signal Sig2 is equal to or greater than the third threshold Th3, it is determined that there is returning light along the second optical axis a2 and the processing proceeds to step S205.

At step S203, comparison between the first signal Sig1 and a first threshold Th1 is performed. The first threshold Th1 is a value smaller than the intensity of the reflected light R1 generated when the laser light L1 is irradiated on the surface of the object OB.

Here, when it is determined that the first signal Sig1 is lower than the first threshold Th1, the laser light L1 is adjust to have the second intensity (step S204). That is, a state in which the first signal Sig1 is smaller than the first threshold Th1 is a state in which the laser light L1 is not irradiated on the surface of the object OB but is emitted toward an open space. In this case, the intensity of the laser light L1 is adjusted to the second intensity that is lower than the usual intensity (the intensity (for example, the first intensity) that is set in the case where the laser light L1 is irradiated on the object OB and there is the reflected light R1). As a result, even when a measurement point is moved and the laser light L1 is irradiated on an edge part of the object OB, generation of strong diffused light R2 is suppressed.

On the other hand, when it is determined at step S202 that the second signal Sig3 is equal to or greater than the third threshold Th3, or it is determined at step S203 that the first signal Sig1 is equal to or greater than the first threshold Th1, the processing proceeds to step S205. At step S205, the value obtained by subtracting the second signal Sig2 from the first signal Sig1 is compared with a second threshold Th2. The second threshold Th2 is a value greater than the value obtained by subtracting the second signal Sig2 from the first signal Sig1 in the usual state in which the laser light L1 is irradiated on the surface of the object OB and the occlusion is not occurring.

When it is determined that the value obtained by subtracting the second signal Sig2 from the first signal Sig1 is greater than the second threshold Th2, the laser light L1 is adjusted to have the first intensity (step S206). That is, the state in which the value obtained by subtracting the second signal Sig2 from the first signal Sig1 is greater than the second threshold Th2 is the state in which the occlusion is occurring. In this case, the intensity of the laser light L1 is adjusted to the usual intensity (for example, the first intensity).

On the other hand, when it is determined at step S205 that the value obtained by subtracting the second signal Sig2 from the first signal Sig1 is equal to or smaller than the second threshold Th2, the intensity of the laser light L1 is feedback-controlled (step S207).

According to the above-described position measuring method of the present embodiment, based on the first signal Sig1 and the second signal Sig2, the state in which the laser light L1 is not irradiated on the object OB but is emitted to an open space or the state in which the occlusion is occurring can be accurately determined. When it is determined that it is in any one of these states, the intensity of the laser light L1 is set to a predetermined value (for example, an intensity equal to or smaller than the usual intensity). As a result, even in the case of having entered the state in which the laser light L1 is irradiated from an open space to the object OB or in the case where the occlusion is resolved, it is possible to prevent a situation where an amount of light captured by the image capturer 20 temporarily becomes excessive, and highly accurate position measurement can be performed.

In the determination at step S205, it is also possible to multiply the first signal Sig1 by a first coefficient k1 and multiply the second signal Sig2 by a second coefficient k2. That is, at step S205, it is also possible that a value obtained by subtracting [the second signal Sig2×the second coefficient k2] from [the first signal Sig1×the first coefficient k1] is compared with the second threshold Th2. The first coefficient k1 and the second coefficient k2 are coefficients for making the intensities of the first signal Sig1 and the second signal Sig2 relatively equivalent. For example, the first coefficient k1 and the second coefficient k2 may depend on a size of a light receiving surface of an optical element such as a lens. It is also possible that the first coefficient k1 and the second coefficient k2 are determined from the intensities of the first signal Sig1 and the second signal Sig2 that are obtained by irradiating the laser light L1 to an object to be measured OB to be measured in advance. As a result, at step S205, the accuracy of the determination based on the second threshold Th2 is improved.

Further, in the position measuring method according to the present embodiment, at least a portion of the subroutine (step S201-step S207 in FIG. 8) of the control (step S104) of the amount of the laser light may be realized using software. In the case of realizing at least a portion of the subroutine using such software, a realization process may be represented using a program executed by a computer and the program may be stored in a computer readable medium. Further, the program may be delivered over a network.

Application Example

Figure 9:
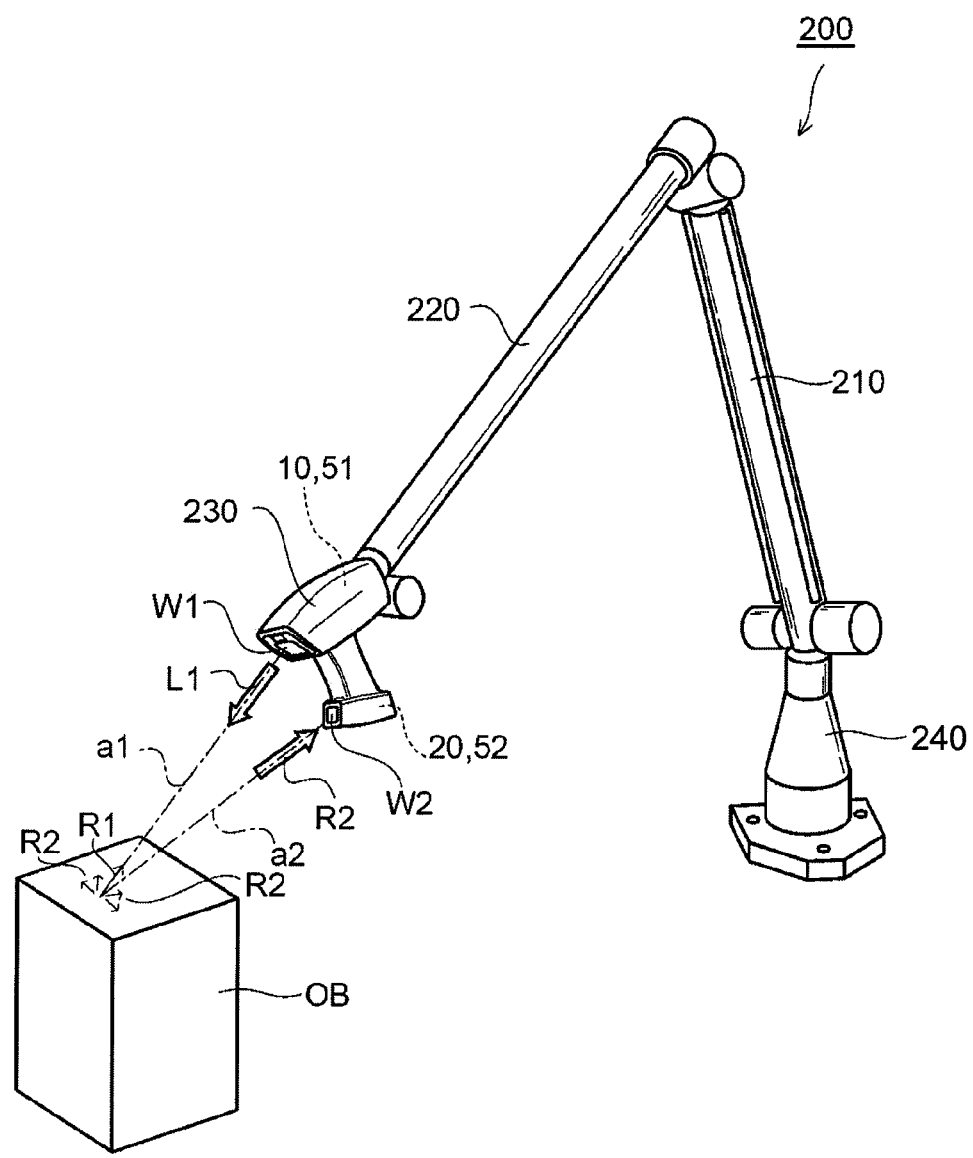
FIG. 9 illustrates a schematic perspective view illustrating an arm type position measuring device.
Figure 10:
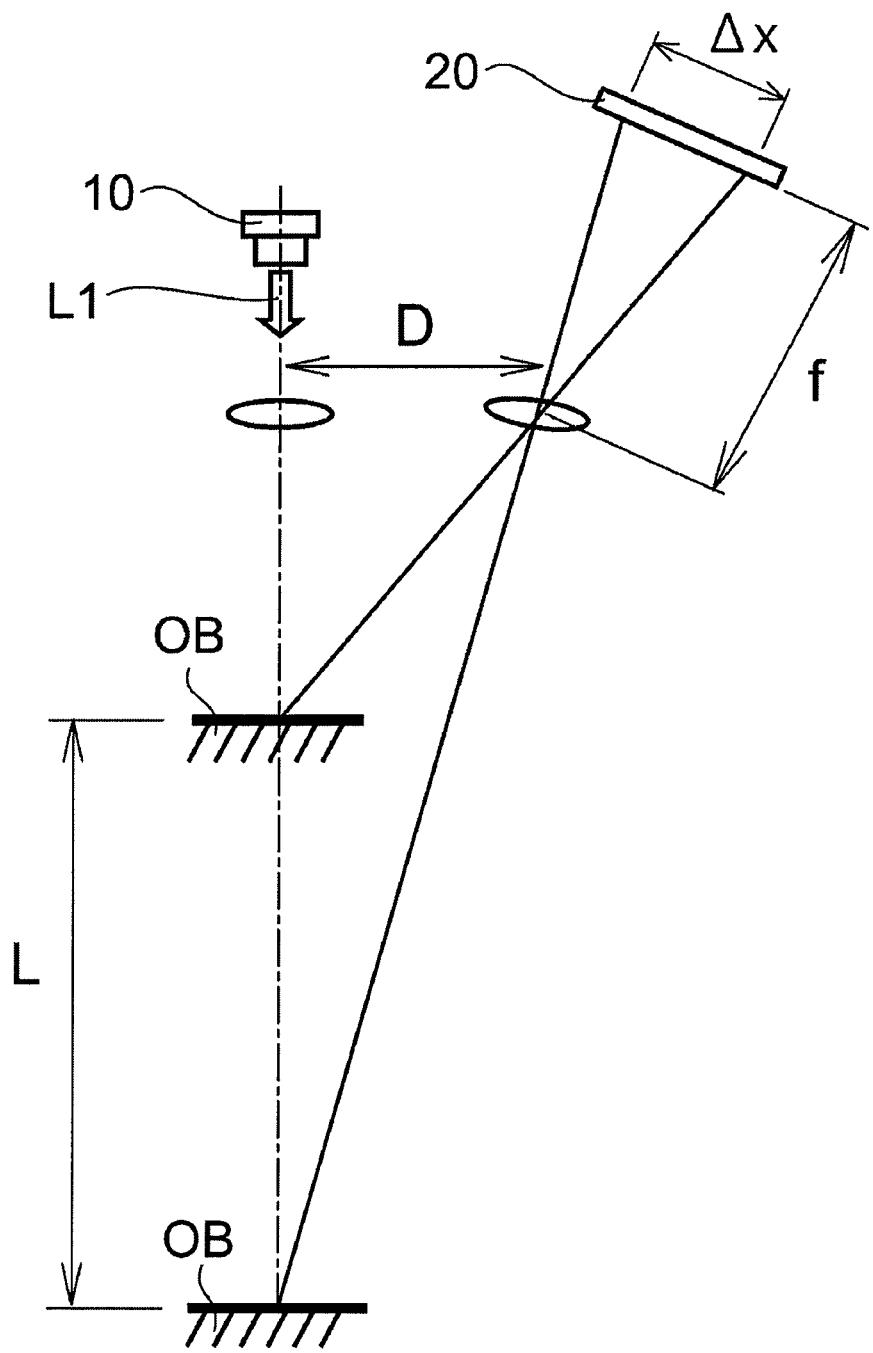
FIG. 10 illustrates a schematic diagram illustrating a non-contact type position measuring device that uses a triangulation method.
Figure 11:
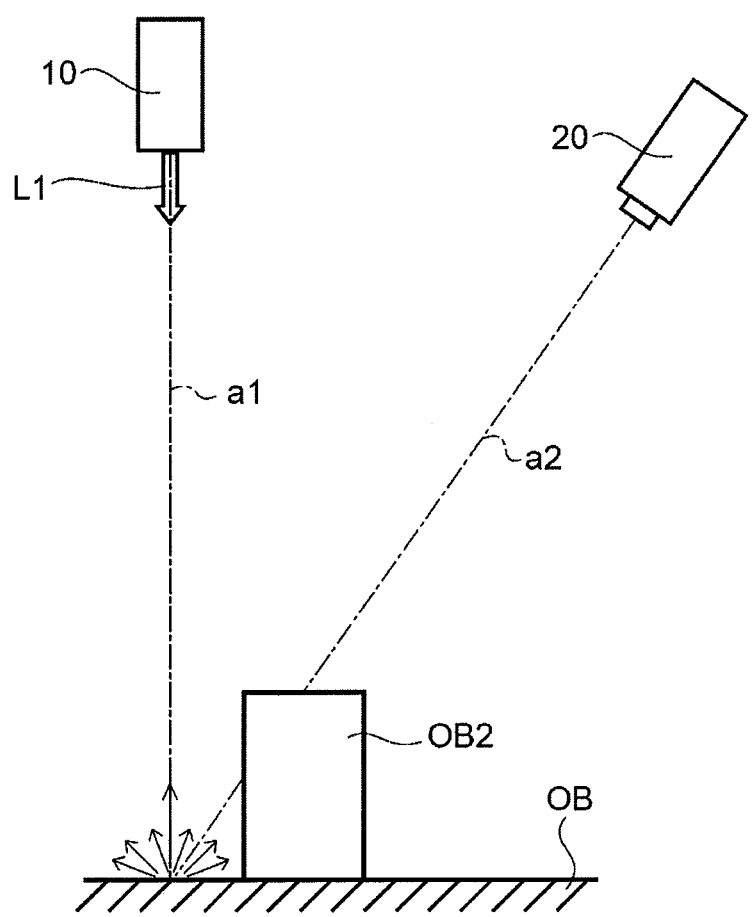
FIG. 11 illustrates a schematic diagram illustrating a state in which the occlusion us occurring.
Figure 12A:
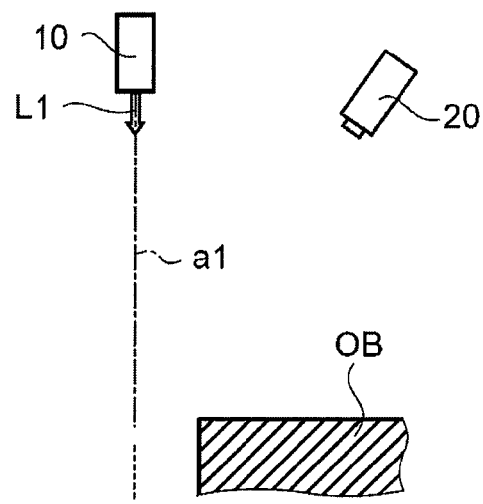
FIGS. 12A and 12B respectively illustrate schematic diagrams of a state in which laser light is not irradiated on an object to be measured and a state in which the laser light is irradiated on the object to be measured.
Figure 12B:
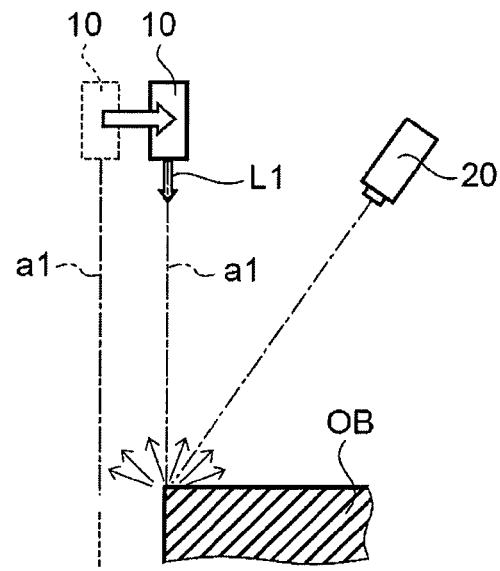

Next, an application example of the present invention is described. FIG. 9 illustrates a schematic perspective view illustrating an arm type position measuring device. As illustrated in FIG. 9, an arm type position measuring device 200 is a position measuring device having a multi-axis structure. The arm type position measuring device 200 includes a first arm 210, a second arm 220, a laser probe 230 and a base part 240.

The base part 240 is fixed on a surface plate (not illustrated in FIG. 9). A lower end of the first arm 210 is attached to the base part 240. The first arm 210 is attached rotatable about, for example, two axes with respect to the base part 240.

A rear end of the second arm 220 is attached to a front end of the first arm 210. The second arm 220 is attached rotatable about one axis with respect to the first arm 210. The laser probe 230 is attached to a front end of the second arm 220. The laser probe 230 is attached rotatable about, for example, two axes with respect to the second arm 220.

The light emitter 10 and the image capturer 20 are incorporated in the laser probe 230. The laser light L1 is emitted from a first window W1 of the laser probe 230. The diffused light R2 from the object OB is captured by the image capturer 20 from a second window W2 of the laser probe 230. Further, in the laser probe 230, the first beam splitter 41 and the first light receiver 51, and, as needed, the second beam splitter 42 and the second light receiver 52, may also be incorporated.

The calculator 30 and the controller 60 are connected to outside of the arm type position measuring device 200 via a cable or the like. The calculator 30 and the controller 60 may be realized using computer software.

A user of the arm type position measuring device 200 causes the laser light L1 to be irradiated from the laser probe 230 to a position of the object OB to be measured and presses a measurement button (not illustrated in the drawing). In this timing, the image capturer 20 captures the diffused light R2 and the calculator 30 performs calculation of the position. The calculation result is displayed, for example, on a computer screen. While the measurement operation is performed, the controller 60 repeats the processing illustrated in FIGS. 7 and 8. As a result, the user can carry out the position measurement in a state in which precise intensity control of the laser light L1 is performed, without being aware of the irradiation position of the laser light L1 or of occurrence of the occlusion.

As described above, according to the position measuring device and the position measuring method of the embodiments, even when the intensity of the laser light is adjusted according to an amount of light received, highly accurate position measurement can be performed.

The embodiments and the application example thereof are described above. However, the present invention is not limited to these examples. For example, with respect to the above-described embodiments or the application example thereof, a person skilled in the art can suitably perform addition, deletion and design modification of configuration elements, and such modifications are also included in the scope of the present invention as long as they fall within the scope of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A position measuring device comprising:
    a light emitter configured to emit laser light along a first optical axis for measurement of a position of an object to be measured;
    an image capturer provided on a second optical axis, the second axis being oblique to the first optical axis;
    a first beam splitter provided on the first optical axis;
    a first light receiver configured to receive a first light that is reflected by the object and propagates along the first optical axis toward the light emitter and that is reflected by the first beam splitter, the first light receiver further configured to output a first signal corresponding to an intensity of the first light;
    a second light receiver configured to output a second signal corresponding to an intensity of a second light that is diffused by the object and propagates along the second optical axis toward the image capturer;
    a calculator configured to calculate the position of the object to be measured based on the light propagating along the second optical axis, and to determine an occurrence of an occlusion based on a difference of the intensity of the first light and the intensity of the second light; and
    a controller configured to control an intensity of the laser light when the calculator determines an occurrence of the occlusion, wherein the controller controls the intensity of the laser light based on the second signal when a difference between the first signal and the second signal is smaller than a predetermined threshold, and wherein the controller is further configured to control the laser light to have a predetermined intensity when the difference between the first signal and the second signal is equal to or greater than the predetermined threshold.

2. The position measuring device according to claim 1, wherein the controller is further configured to control the laser light to have the predetermined intensity when a value of the first signal is equal to or smaller than a predetermined value.

3. The position measuring device according to claim 1, wherein the controller is further configured to:
    feedback-control the intensity of the laser light based on the second signal when the difference between the first signal and the second signal is smaller than the predetermined threshold, and
    set the intensity of the laser light to a value equal to or less than a target value of the feedback control when the difference between the first signal and the second signal is equal to or greater than the predetermined threshold.

4. The position measuring device according to claim 2, wherein the controller is further configured to:
feedback-control the intensity of the laser light based on the second signal when the difference between the first signal and the second signal is smaller than the predetermined threshold, and
set the intensity of the laser light to a value equal to or less than a target value of the feedback control when the difference between the first signal and the second signal is equal to or greater than the predetermined threshold.

5. The position measuring device according to claim 1, further comprising:
a second beam splitter provided on the second optical axis to reflect the second light, wherein the second light receiver is configured to receive the second light reflected by the second beam splitter and is further configured to output the second signal.

6. The position measuring device according to claim 2, further comprising:
a second beam splitter provided on the second optical axis to reflect the second light, wherein the second light receiver is configured to receive the second light reflected by the second beam splitter and is further configured to output the second signal.

7. The position measuring device according to claim 3, further comprising:
a second beam splitter provided on the second optical axis to reflect the second light, wherein the second light receiver is configured to receive the second light reflected by the second beam splitter and is further configured to output the second signal.

8. The position measuring device according to claim 4, further comprising:
a second beam splitter provided on the second optical axis to reflect the second light, wherein the second light receiver is configured to receive the second light reflected by the second beam splitter and is further configured to output the second signal.

9. A position measuring device comprising:
a light emitter configured to emit laser light along a first optical axis for measurement of a position of an object to be measured;
a first beam splitter provided on the first optical axis;
a first light receiver configured to receive a first light reflected by the object and propagates along the first optical axis toward the light emitter, the first light being reflected by the first beam splitter to be received by the first light receiver, and configured to output a first signal corresponding to an intensity of the first light;
an image capturer configured to receive a second light diffused by the object and propagates along a second optical axis, which is oblique to the first optical axis, and configured to output a second signal corresponding to an intensity of the second light;
a calculator configured to calculate the position of the object to be measured based on the light propagating along the second optical axis, and to determine an occurrence of an occlusion based on a difference of the intensity of the first light and the intensity of the second light; and
a controller configured to control an intensity of the laser light when the calculator determines an occurrence of the occlusion, wherein the controller controls the intensity of the laser light based on the second signal when a difference between the first signal and the second signal is smaller than a predetermined threshold, and wherein the controller is further configured to control the laser light so that the laser light has a predetermined intensity when the difference between the first signal and the second signal is equal to or greater than the predetermined threshold.

10. A position measuring method comprising:
emitting laser light from a light emitter along a first optical axis towards an object to be measured;
receiving a first light reflected by the object and propagating along the first optical axis toward the light emitter and obtaining a first signal corresponding to an intensity of the first light;
receiving a second light diffused by the object through an image capturer provided on a second optical axis, which is oblique to the first optical axis, obtaining information of a light receiving position, and receiving the second light propagating along the second optical axis toward the image capturer and obtaining a second signal corresponding to an intensity of the second light;
calculating a position of an object to be measured using the information of the light receiving position obtained through the image capturer;
determining an occurrence of an occlusion based on a difference of the intensity of the first light and the intensity of the second light; and
controlling an intensity of the laser light when the calculator determines an occurrence of the occlusion, wherein the controller controls the intensity of the laser light based on the second signal when a difference between the first signal and the second signal is smaller than a predetermined threshold, and controlling the laser light to have predetermined intensity when the difference between the first signal and the second signal is equal to or greater than the predetermined threshold.

11. The position measuring method according to claim 10, wherein the controlling of the intensity of the laser light comprises controlling the laser light to have the predetermined intensity when a value of the first signal is equal to or less than a predetermined value.

12. The position measuring method according to claim 10, wherein the controlling of the intensity of the laser light comprises:
feedback-controlling the intensity of the laser light based on the second signal when the difference between the first signal and the second signal is equal to or smaller than the predetermined threshold, and
setting the intensity of the laser light to a value equal to or less than a target value of the feedback-controlling when the difference between the first signal and the second signal is greater than the predetermined threshold.

13. The position measuring method according to claim 11, wherein the controlling of the intensity of the laser light comprises:
feedback-controlling the intensity of the laser light based on the second signal when the difference between the first signal and the second signal is equal to or smaller than the predetermined threshold, and
setting the intensity of the laser light to a value equal to or less than a target value of the feedback-controlling when the difference between the first signal and the second signal is greater than the predetermined threshold.

* * * * *